United States Patent
Wu

(10) Patent No.: US 8,243,917 B2
(45) Date of Patent: Aug. 14, 2012

(54) METHOD FOR INDICATING CHARGE STATUS OF BACKUP POWER SUPPLY AND COMMUNICATION DEVICE EMPLOYING THE SAME

(75) Inventor: Kun-Yi Wu, Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 695 days.

(21) Appl. No.: 12/406,083

(22) Filed: Mar. 17, 2009

(65) Prior Publication Data

US 2009/0257577 A1    Oct. 15, 2009

Related U.S. Application Data

(63) Continuation of application No. 12/346,766, filed on Dec. 30, 2008.

(30) Foreign Application Priority Data

Apr. 11, 2008    (CN) .......................... 2008 1 0301051

(51) Int. Cl.
 *H04M 1/00*    (2006.01)

(52) U.S. Cl. .................. 379/413; 379/9.05; 379/201.01; 379/433.08

(58) Field of Classification Search .................. 379/413, 379/433.08, 9.05, 201.01
See application file for complete search history.

(56) References Cited

U.S. PATENT DOCUMENTS

2004/0214610 A1* 10/2004 Tanemura et al. ............ 455/566
2007/0274716 A1* 11/2007 Ying et al. ...................... 398/58

FOREIGN PATENT DOCUMENTS

CN    101039360 B    9/2010
TW    200937030 A    9/2009

* cited by examiner

*Primary Examiner* — Gerald Gauthier
*Assistant Examiner* — Simon King
(74) *Attorney, Agent, or Firm* — Altis Law Group, Inc.

(57) ABSTRACT

A method for indicating the charge status of a backup power supply of a communication device includes detecting the charge status of the backup power supply. If the charge status of the backup power supply is lower than or equal to a predetermined charge status, the communication device alerts via a telephone connected thereto. The communication device alerts a user by sounding one or more tones if the telephone is off-hook, and alerts user by sounding one or more rings if the telephone is on-hook.

8 Claims, 4 Drawing Sheets

METHOD FOR INDICATING CHARGE STATUS OF BACKUP POWER SUPPLY AND COMMUNICATION DEVICE EMPLOYING THE SAME

CROSS-REFERENCE TO RELATED APPLICATIONS

This application is a continuation of U.S. patent application Ser. No. 12/346,766, entitled "METHOD FOR INDICATING CHARGE STATUS OF BACKUP POWER SUPPLY AND COMMUNICATION DEVICE EMPLOYING THE SAME" filed on Dec. 30, 2008. The prior application is incorporated herein in its entirety by reference.

BACKGROUND

1. Technical Field

The present disclosure relates to a charge status measurement and communication method, and more particularly to a method for indicating charge status of a backup power supply and a communication device using the same.

2. Description of Related Art

Traditional telephones usually do not need an additional power line connected to a socket to provide electrical power, and can work with electrical power provided over the telephone line. That is, the traditional telephone can still work during a localized power outage.

Voice over Internet Protocol (VoIP) service is getting more and more popular these days and provides another convenient choice for telephony services. A communication device that uses a VoIP service may require a local power supply, which means VoIP services may not be available during power outages.

DETAILED DESCRIPTION

Figure 1:
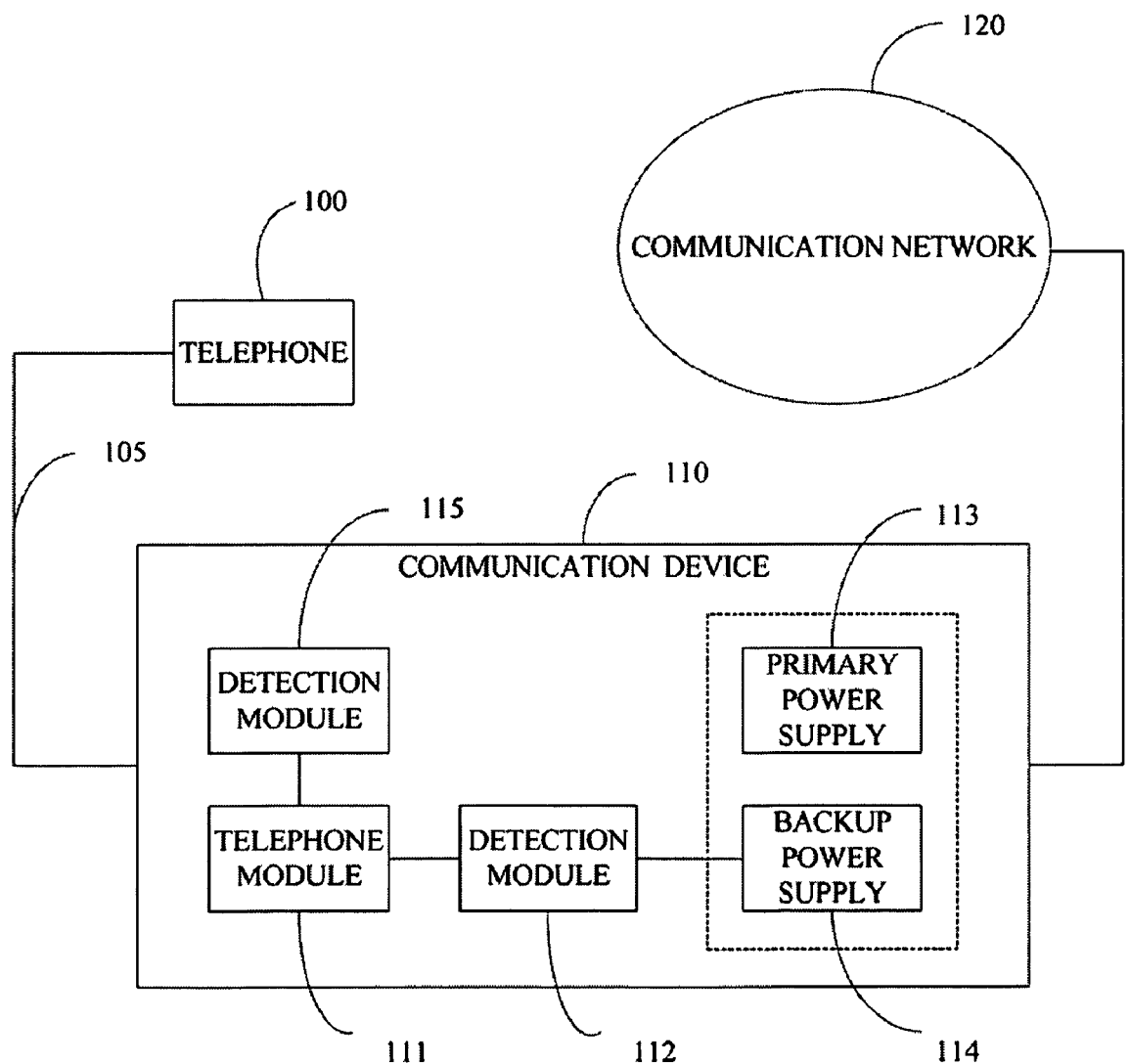
FIG. 1 is a schematic diagram of a communication device and a telephone.

FIG. 1 is a schematic diagram of a communication device 110, which is connected to and cooperates with a communication terminal, such as a telephone 100 or a personal computer. The telephone 100 and the communication device 110 are both customer premise equipments. The telephone 100 directly communicates with the communication device 110 via a cable 105. The telephone 100 may be a traditional telephone equipped with a landline or any kind of Internet Protocol (IP) telephone. The communication device 110 may comprise any customer premise equipment, such as a set-top box, a digital subscriber line (DSL) modem, a cable modem, or any other type of integrated access device. The communication device 110 is connected to a communication network 120. The communication network 120 may be the Internet or a local area network (LAN), which may comprise a plurality of telephones or communication devices that can be configured to communicate with the telephone 100.

According to an embodiment, the communication device 110 comprises a telephone module 111, a first detection module 112, a primary power supply 113, a backup power supply 114, and a second detection module 115. The telephone module 111 is utilized to communicate with a communication terminal, such as the telephone 100. The first detection module 112 is utilized to detect a charge status of the backup power supply 114. The charge status indicates how many percent charged is the backup power supply, such as fully charged, 80% charged etc. The telephone module 111 may comprise an integrated circuit (IC) with telephony communication capabilities, and the first detection module 112 may be made up of a voltage detection circuit of the IC of the telephone module 111. The primary power supply 113 provides electrical power for the communication device 110 to operate. The primary power supply 113 may be connected to an external power source. In one example, the primary power supply 113 may be connected to a home electrical socket via a power adapter. In another example, the primary power supply 113 may comprise at least one transformer for converting external power to an appropriate voltage level for the communication device 110 and a rectifier circuit for converting alternating current to appropriate direct current for respective internal modules of the communication device 110. The backup power supply 114 may comprise one or more batteries. The second detection module 115 detects and determines work status of the telephone 100. For example, if the telephone 100 is in use, the second detection module 115 determines that the work status of the telephone 100 is off-hook. If the telephone is not in use, the second detection module 115 determines that the work status of the telephone 100 is on-hook.

The backup power supply 114 is configured to provide power to the communication device 110 when power provided by the primary power supply 113 is insufficient such as during a blackout.

The communication device 110 may actively monitor charge status of the backup power supply 114, or passively receive charge status queries and respond with messages indicating the charge status of the backup power supply 114. Active charge status monitoring is explained next.

Figure 2:
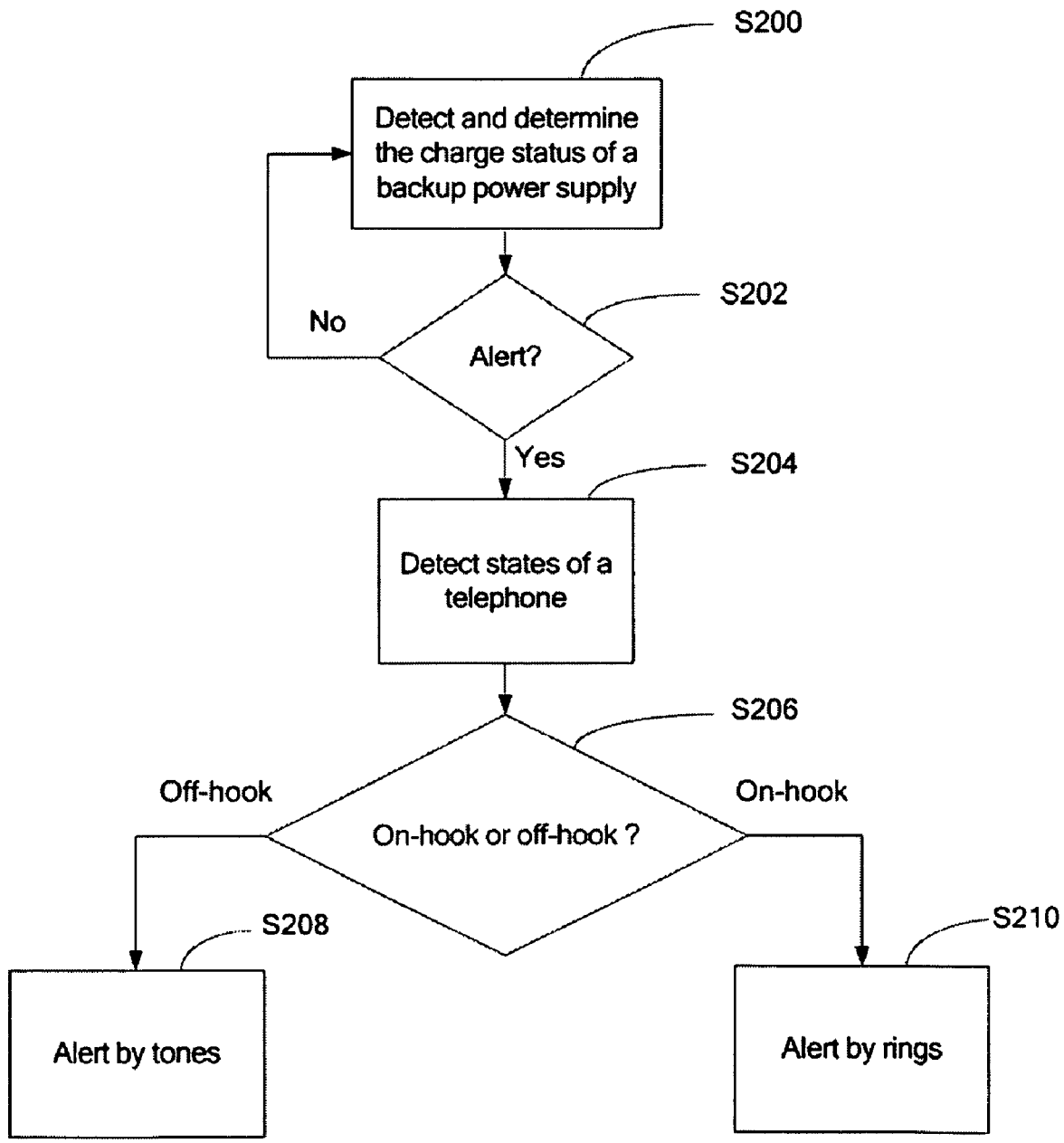
FIG. 2 is a flowchart of one embodiment of actively monitoring charge status of a backup power supply.

With reference to FIG. 2, the first detection module 112 actively and continuously detects charge status of the backup power supply 114 of the communication device 110 (step S200) and determines whether to activate an alarm based on the detected charge status of the backup power supply 114. If the first detection module 112 determines to activate an alarm, step S204 is executed. If the first detection module 112 determines not to activate an alarm, step S200 is repeated.

In one example, the first detection module 112 may convert the detected charge status of the backup power supply 114 into a numerical format, and determine if that number is lower than a predetermined value. If the numerical charge status of the backup power supply 114 is lower than the predetermined value, the first detection module 112 determines that the backup power supply 114 has too little charge remaining and activates the alarm. If the numerical charge status of the backup power supply 114 is higher than or equal to the predetermined value, the first detection module 112 determines that the backup power supply 114 is has sufficient charge remaining.

It should be understood that a plurality of predetermined values may be utilized to differentiate many charge statuses associated with different alarm or non-alarm conditions.

The alarm means may comprise different tones, rings and messages. The alarm frequency may also be adjusted. For example, when charge status of the backup power supply 114 gets lower, the frequency of alarms signals may increase such as from once every minute for 40% charge remaining to once every ten seconds for 10% charge remaining to impart a greater sense of urgency to a user. If the alarms are in the form of messages, they may comprise caller identification (caller ID, or caller number identification) information. Exemplary disclosure of different charge statuses and corresponding alarm means are shown in Table 1.

TABLE 1

| Charge status | The first alarm means | The second alarm means | The third alarm means |
|---|---|---|---|
| The first status | The first tone | The first ring | The first caller ID |
| The second status | The second tone | The second ring | The second caller ID |
| ... | ... | ... | ... |
| The $N_{th}$ status | The $N_{th}$ tone | The $N_{th}$ ring | The $N_{th}$ caller ID |

The alarms may comprise tones, rings and caller ID information. N is a positive integer greater than 2. The caller ID information may comprise characters, numbers, symbols or figures to represent a corresponding charge status. For example, a caller ID "CHARGE20" is utilized to indicate the charge status of the back power supply is 20% charged. The first detection module 112 can determine charge status of the backup power supply 114 and a caller ID information corresponding to the charge status.

In step S204, the second detection module 115 detects work status of the telephone 100 (step S204) and determines whether the telephone 100 is in an on-hook state or an off-hook state. In this embodiment, for example, the second detection module 115 detects status of the telephone 100 utilizing the telephone module 111. It is to be understood that the communication device 110 may notify any other telephone or telephones of the charge status of the backup power supply 114. The second detection module 115 may distinguish states of the telephone 100 other than on-hook or off-hook.

When the telephone 100 is off-hook, the telephone module 111 alerts a user by sounding one or more tones (step S208). In addition, the telephone module 111 may utilize caller ID format to transmit a charge status message to the telephone 100.

Figure 3:
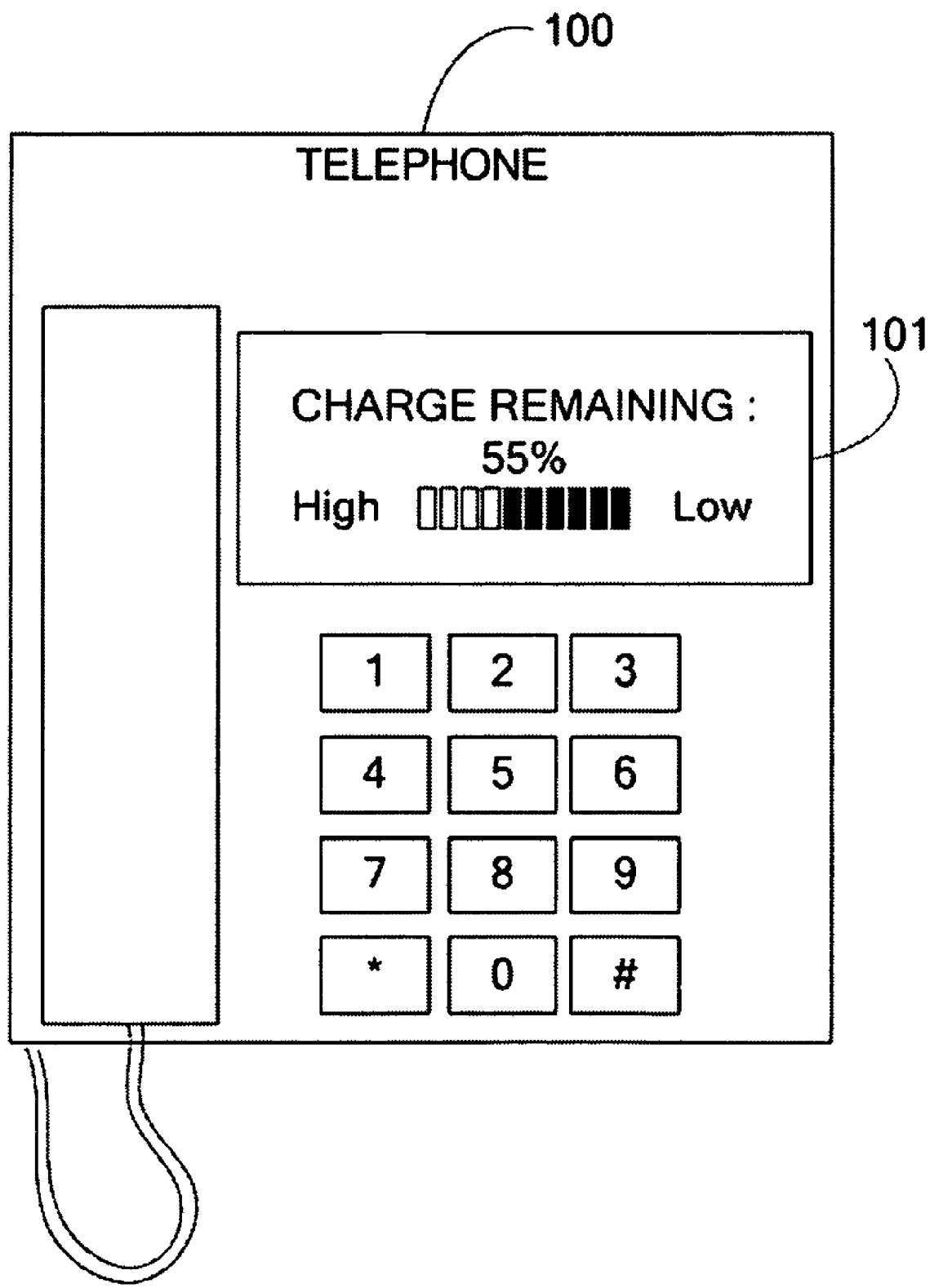
FIG. 3 is a schematic diagram of one embodiment of a telephone equipped with a display.

FIG. 3 shows an exemplary embodiment of the telephone 100. The telephone 100 is equipped with a display 101. Upon receiving a charge status message of the backup power supply 114, the telephone 100 displays the message on the display 101.

When the telephone 100 is on-hook, the telephone module 111 alerts a user by one or more rings (step S210). In addition, the telephone module 111 may also utilize caller ID format to transmit a charge status message of the backup power supply 114. Upon receiving a charge status message of the backup power supply 114, the telephone 100 displays the message on the display 101.

This is the way that the communication device 110 can actively notify a telephone of charge status of the backup power supply 114. The passive charge status alerting is explained next.

When the telephone 100 sends a charge status query to the communication device 110, the communication device 110 receives the charge status query and responds to the query with a message indicating the charge status of the backup power supply 114. The telephone 100 may call specific numbers to query the charge status of the backup power supply 114. For example, the communication device 110 stores a digit map table, and each entry in the digit map table comprises a digit map. The communication device 110 compares a called number sent by the telephone 100 with the digit maps. If the called number conforms to a specific digit map, the communication device 110 takes the called number as a charge status query and responds to the query.

Figure 4:
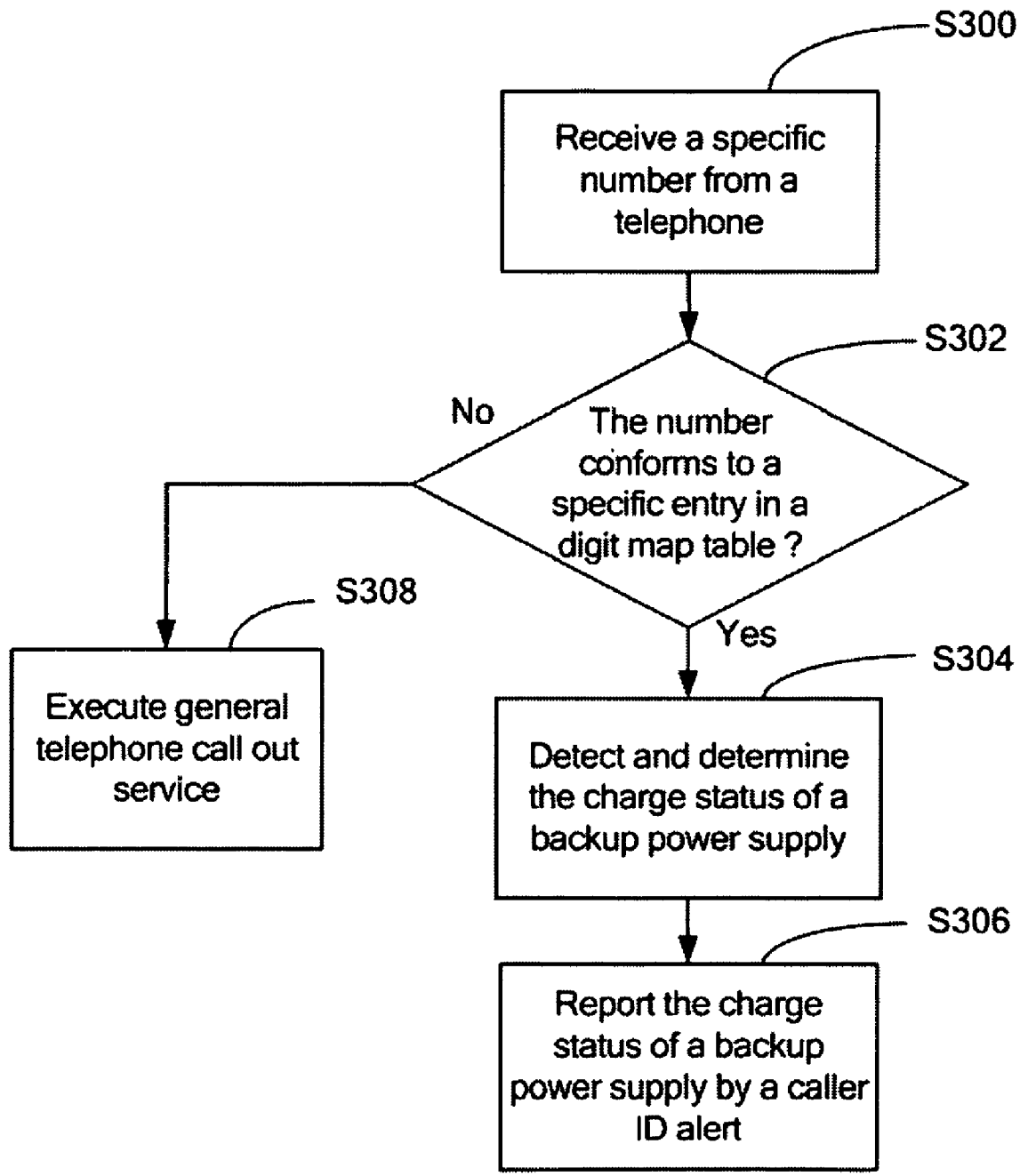
FIG. 4 is a flowchart of one embodiment of passively altering charge status of a backup power supply.

With reference to FIG. 4, the communication device 110 receives a specific number from the telephone 100 (step S300) and determines whether the number sent from the telephone 100 conforms to a specific entry in the specific digit map table (step S302). If the number conforms to the specific entry, the first detection module 112 detects and determines the current charge status of the backup power supply 114 (step S304), and responds to the received number with a caller ID via the telephone module 111 to notify the telephone 100 of the current charge status message of the backup power supply 114.

If the number sent from the telephone 100 does not conform to any entry in the digit map table, the communication device 110 executes general telephone call out service in response to the received number (step S308).

In conclusion, the foregoing communication device 110 may actively monitor charge status of the backup power supply 114, or passively receive charge status queries and respond thereto with charge status messages. The method of notifying users of charge status information may comprise different tones, rings, and messages. The frequency of charge status notifications may also be adjusted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for indicating a charge status of a backup power supply of a communication device, comprising:
   receiving a charge status query from a telephone connected to the communication device, wherein the charge status query is a called number sent by the telephone, and wherein a digit map table including a plurality of entries is stored in the communication device;
   comparing the called number with at least one entry in the digit map table; and
   responding to the charge status query by sending a charge status message of the backup power supply to the telephone when the called number conforms to at least one entry in the digit map table;
   wherein the backup power supply provides electrical power for the communication device to operate when a primary power supply stops providing electrical power for the communication device.

2. The method as described in claim 1, wherein the communication device displays the charge status message on the telephone in response to the charge status query.

3. The method as described in claim 2, wherein the communication device transmits the charge status message of the backup power supply in a caller identification (ID) format to the telephone.

4. The method as described in claim 1, wherein the telephone communicates and connects directly to the communication device via a cable.

5. A communication device, comprising:
   a primary power supply providing electrical power for the communication device to operate;

a backup power supply providing electrical power for the communication device to operate when the primary power supply stops supplying electrical power for the communication device; and digit map table including a plurality of entries;

a telephone module configured for receiving a charge status query from a telephone connected to the communication device, wherein the charge status query is a called number sent by the telephone, and the telephone module compares the called number with at least one entry in the digit map table, and responding to the charge status query by sending a charge status message of the backup power supply to the telephone when the called number conforms to at least one entry in the digit map table.

6. The communication device as described in claim 5, wherein the communication device displays the charge status message on the telephone in response to the charge status query.

7. The communication device as described in claim 6, wherein the communication device transmits the charge status message of the backup power supply in a caller identification (ID) format to the telephone.

8. The communication device as described in claim 5, wherein the telephone communicates and connects directly to the network access device via a cable.

* * * * *